(12) United States Patent
Jogalekar et al.

(10) Patent No.: US 8,165,021 B2
(45) Date of Patent: Apr. 24, 2012

(54) POLICY-BASED RESOURCE MANAGEMENT

(75) Inventors: Prasad Prabhakar Jogalekar, Sunnyvale, CA (US); Arnold Mark Bilstad, Redwood City, CA (US); Rajneesh Kumar, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 305 days.

(21) Appl. No.: 11/899,935

(22) Filed: Sep. 5, 2007

(65) Prior Publication Data

US 2009/0059785 A1 Mar. 5, 2009

(51) Int. Cl.
- G01R 31/08 (2006.01)
- G06F 11/00 (2006.01)
- G08C 15/00 (2006.01)
- H04J 1/16 (2006.01)
- H04J 3/14 (2006.01)
- H04L 1/00 (2006.01)
- H04L 12/26 (2006.01)
- H04L 12/28 (2006.01)
- H04L 12/56 (2006.01)

(52) U.S. Cl. ........................ 370/230; 370/235; 370/395.2

(58) Field of Classification Search .................. 370/230, 370/230.1, 235, 395.2, 395.21, 395.4, 395.41, 370/395.42, 395.43
See application file for complete search history.

(56) References Cited

U.S. PATENT DOCUMENTS

| | | | |
|---|---|---|---|
| 6,597,919 B1 * | 7/2003 | Kumar et al. | 370/230 |
| 7,065,586 B2 * | 6/2006 | Ruttenberg et al. | 709/244 |
| 7,191,273 B2 * | 3/2007 | Weber | 710/244 |
| 2004/0151187 A1 * | 8/2004 | Lichtenstein | 370/395.21 |
| 2004/0156367 A1 * | 8/2004 | Albuquerque et al. | 370/395.4 |
| 2005/0009533 A1 | 1/2005 | Benveniste et al. | |
| 2005/0063330 A1 * | 3/2005 | Lee et al. | 370/328 |
| 2005/0207340 A1 * | 9/2005 | O'Neill | 370/230 |
| 2007/0036078 A1 * | 2/2007 | Chowdhury et al. | 370/230 |
| 2007/0189166 A1 * | 8/2007 | Johnson et al. | 370/230 |
| 2008/0049761 A1 * | 2/2008 | Lin et al. | 370/395.21 |
| 2008/0062880 A1 * | 3/2008 | Yew et al. | 370/235 |
| 2008/0225722 A1 * | 9/2008 | Khemani et al. | 370/235 |

OTHER PUBLICATIONS

Kumar et al., "Integrating Camp-on Telephony Feature with WLAN Resource Management and Admission Control," U.S. Appl. No. 11/405,319, filed Apr. 17, 2006.

* cited by examiner

*Primary Examiner* — Xavier Szewai Wong
(74) *Attorney, Agent, or Firm* — Weaver Austin Villeneuve & Sampson LLP

(57) ABSTRACT

In one embodiment, a network device receives a request from a client in association with a connection, where the request indicates an amount of one or more resources that is requested to support the connection. The network device determines whether the amount of the resources is available. The network device may then allocate a level of the resources to the connection according to whether the amount of the resources is available.

36 Claims, 8 Drawing Sheets

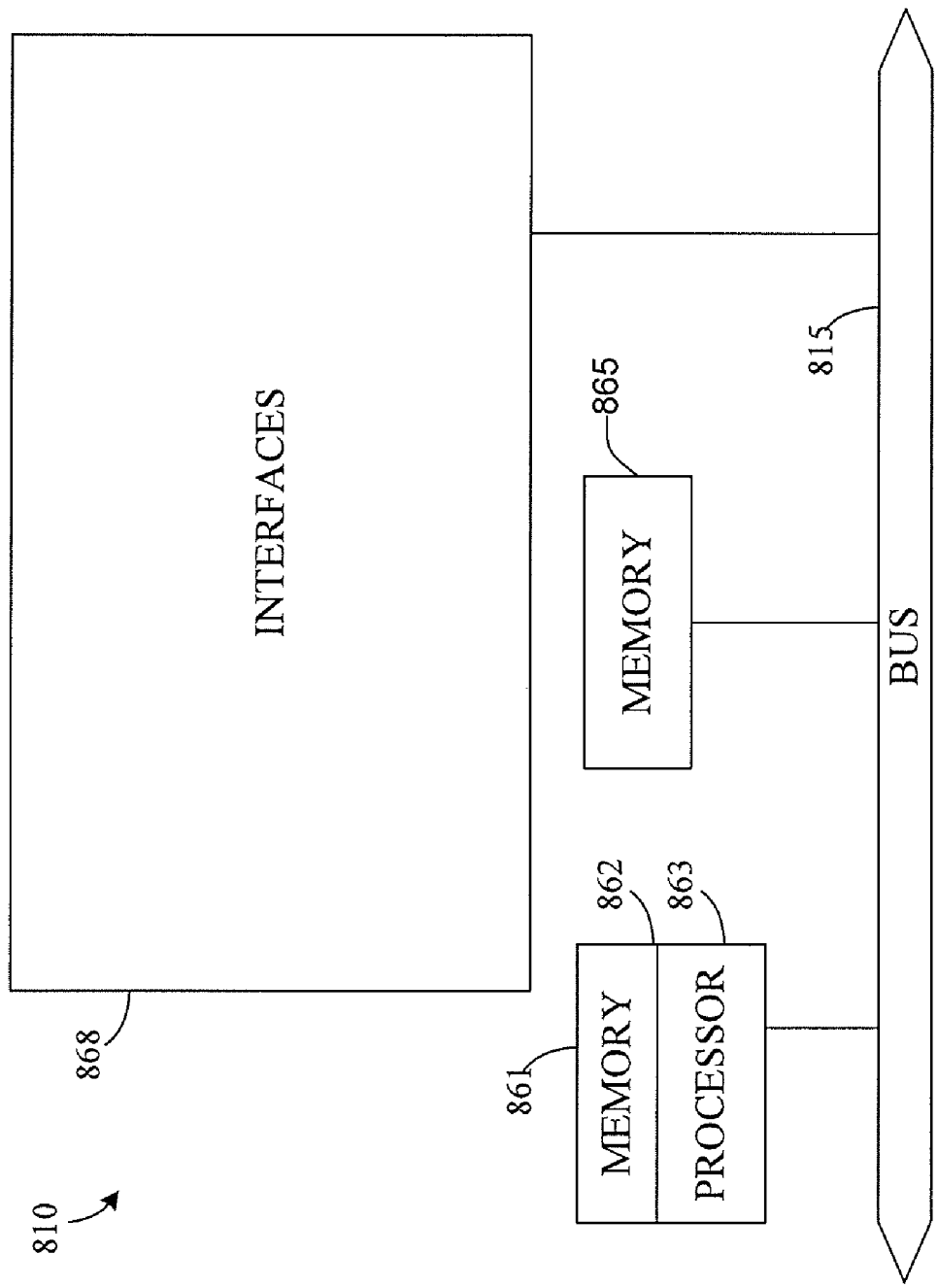

POLICY-BASED RESOURCE MANAGEMENT

BACKGROUND

1. Technical Field

The present disclosure relates generally to methods and apparatus for managing resources that may be allocated to one or more connections.

2. Description of the Related Art

When a user initiates a connection, current connection admission schemes result in either accepting or rejecting the connection. For instance, when a user initiates a call, the call may be rejected when there are insufficient resources to process the call. As a result, the number of connections that can be supported is limited.

BRIEF DESCRIPTION OF THE DRAWINGS

FIG. 8 is a diagrammatic representation of an example router in which various embodiments may be implemented.

DESCRIPTION OF EXAMPLE EMBODIMENTS

In the following description, numerous specific details are set forth in order to provide a thorough understanding of the disclosed embodiments. It will be obvious, however, to one skilled in the art, that the disclosed embodiments may be practiced without some or all of these specific details. In other instances, well-known process steps have not been described in detail in order not to unnecessarily obscure the disclosed embodiments.

Overview

In one embodiment, a network device receives a request from a client in association with a connection, where the request indicates an amount of one or more resources that is requested to support the connection. The network device determines whether the amount of the resources is available. The network device may then allocate a level of the resources to the connection according to whether the amount of the resources is available.

Specific Example Embodiments

When a client initiates a connection between two or more endpoints, the client may request an amount of one or more resources to support the connection. Examples of such resources may include, but are not limited to, Quality of Service (QoS), bandwidth, or other resources in a wired or wireless network.

Each of the endpoints may be supported by a wired connection or a wireless connection to a network. For example, the network may be a Wide Area Network (WAN) or a Local Area Network (LAN). A client may be any device, such as a computer, laptop, telephone (e.g., Voice over IP phone), wireless LAN phone, cell phone, or any other device that includes a processor and a memory.

Figure 1:
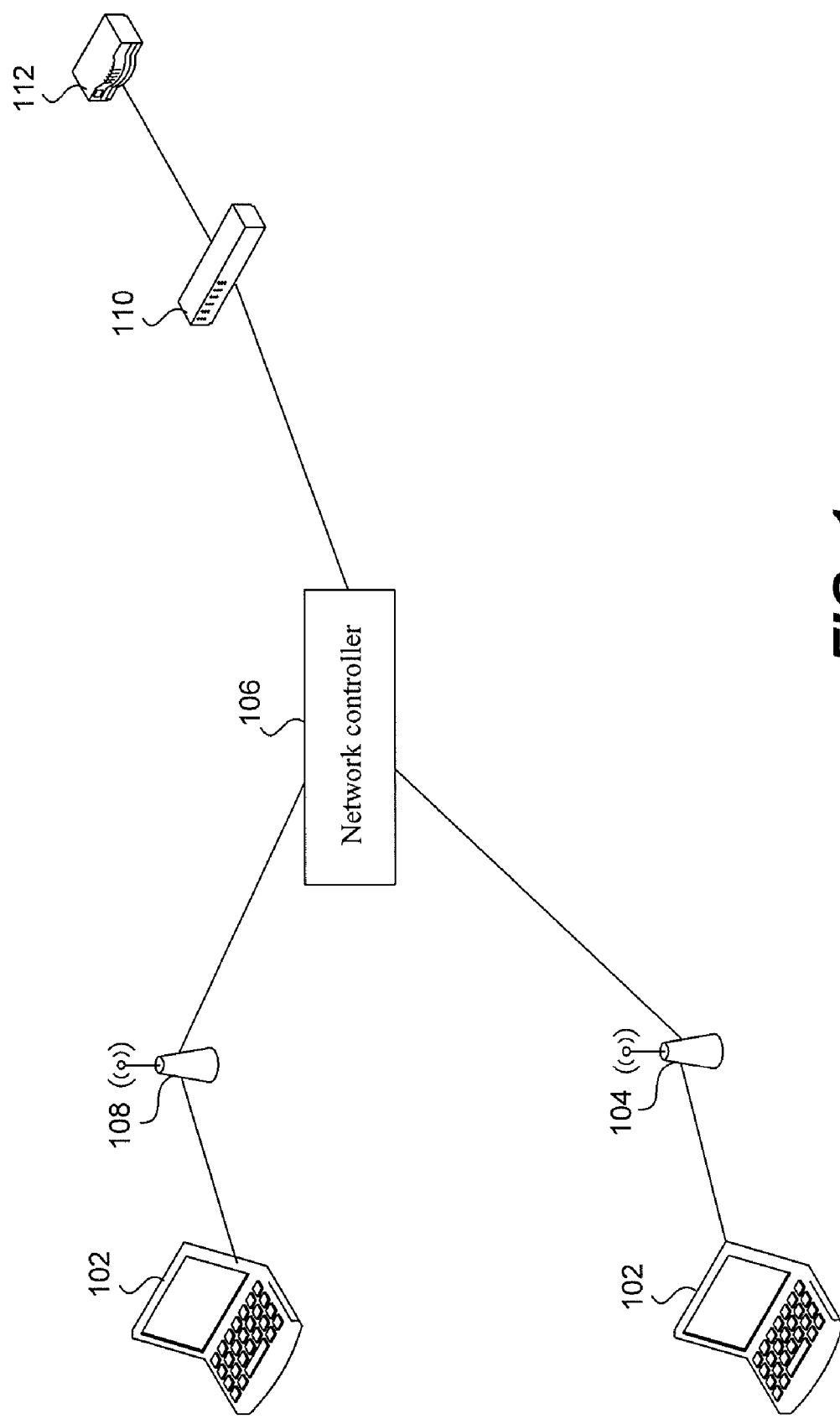
FIG. 1 is an example system.

FIG. 1 is an example system. When a client 102 establishes a connection to the network via a device such as an Access Point (AP) 104, it may request resources to support the connection. The request for resources may be implicit in a connection request requesting that the connection be established. Alternatively, the request for resources may be transmitted separately from a request to establish the connection. For instance, the request for resources may be sent prior to the request to establish the connection. Thus, the network may include one wireless hop, represented by the AP 104 in this example.

The client may transmit the request for resources in the form of a service level agreement (SLA) request or a message in another signaling protocol. Alternatively, the client may transmit the request for resources in the form of an application level message. For instance, a header of a data packet may include information pertinent to the request for resources.

When the AP 104 receives a request for resources, the AP 104 may determine whether the requested resources are available. Alternatively, the AP 104 may communicate with a network controller 106 (e.g., by forwarding the request or information obtained from the request to the network controller 106), which may determine whether the requested resources are available. Based upon the determination, the AP 104 or the network controller 106 may either allocate the requested resources to the connection or place the connection on a wait list in order to provide a limited level of resources to the connection, as will be described in further detail below.

If the client 102 roams to another AP 108, the client 102 may again submit a request for resources. The AP 108 or the network controller 106 may determine whether the requested resources are available and allocate resources accordingly. More particularly, the AP 108 and/or network controller 106 may maintain information associated with a plurality of clients. For instance, this information may identify each of the clients (e.g., via IP address), the network (e.g., enterprise network) from which the client wishes to establish the connection, the access point (e.g., the access point via which the network controller 106 has been made aware of the request for resources), and/or the amount of each resource that has been allocated to each of the clients. The amount of the resources that have been allocated to a client may be maintained in the form of a SLA between the client and the network (e.g., a network device such as an access point).

In accordance with various embodiments, the network controller 106 may maintain a data structure such as a table for each access point, where each table maintains a list of clients connected to the network via the corresponding access point and the amount of resources that have been allocated to each client. In addition or alternatively, the AP 108 may maintain its corresponding list of clients and the amount of resources that have been allocated to each client. The amount of resources that have been allocated to a particular client may be represented by parameters (and corresponding values) specified in a SLA.

Once the system has allocated resources to the connection, a data exchange may be performed between the client 102 and one or more other endpoints. Such a data exchange may be accomplished via a variety of network devices, such as a switch 110 and/or router 112. For example, the data exchange may include the transmission of voice, video, text, and/or email.

Figure 2:
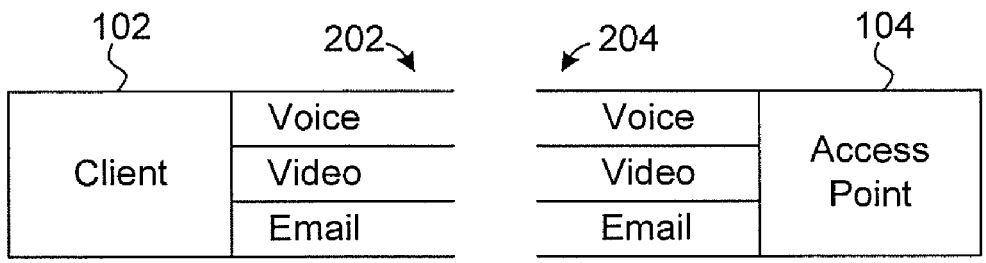
FIG. 2 is a diagram illustrating an example mechanism for prioritizing data communications.

Different types of connections or data exchanges may request different levels of resources. For instance, a voice communication is more sensitive to time delay than other types of communications such as email. FIG. 2 is a diagram illustrating an example mechanism for prioritizing data communications. As shown in FIG. 2, when the client device 102 transmits data, it may prioritize the data in one or more queues 202. In this example, the queues 202 include separate queues for voice communications, video communications, and email communications. As shown in this example, the highest queue corresponding to voice communications may be provided more aggressive access to resources than the lowest queue corresponding to email communications. Although not shown, other endpoints participating in the connection may also support a similar prioritization mechanism.

The AP 104 (or network controller 106) may similarly prioritize data it receives in one or more queues 204. In this example, the queues 204 include separate queues for voice communications, video communications, and email communications. The highest queue may receive more aggressive access to resources than the lowest queue.

Figure 3:
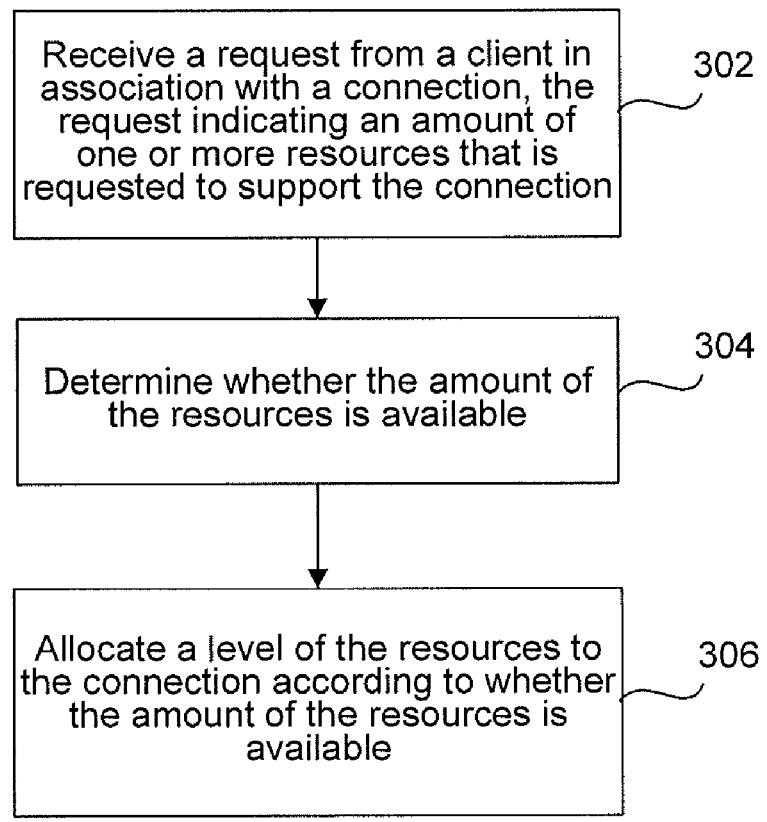
FIG. 3 is a process flow diagram illustrating an example method of performing resource management.

FIG. 3 is a process flow diagram illustrating an example method of performing resource management. A network device such as an access point or network controller may receive a request from a client in association with a connection at 302. The request may indicate an amount of each of one or more resources that is requested to support the connection. For instance, the request may be a service level agreement (SLA) request indicating one or more resource parameters associated with the one or more resources. The SLA may include a traffic specification (TSPEC), which includes a plurality of parameters and corresponding values. More particularly, the resource parameters may be enhanced distributed channel access (EDCA) parameters that have been configured on the client. For instance, the parameters may include a rate of stream, average packet size (e.g., average main digital switching Media Access Control (MAC) service data unit (MSDU) size), maximum packet size (e.g., maximum MSDU size), maximum latency for a given packet per hop, peak packet rate, packet burst size, packetization period (e.g., how often the client will send packets), and/or price associated with packet transmission. As one example, the packetization period may indicate that voice packets are transmitted every 20 milliseconds.

In response to the request, the network device may determine whether the requested amount of each of the resources is available at 304. The network device may allocate a level of the resources to the connection at 306 according to whether the amount of the resources is available.

There are a variety of ways in which resources may be managed to support multiple connections. As will be described in further detail below with reference to FIG. 4 and FIG. 5A, a network device may accomplish resource management using one or more wait lists. In addition, the network device may also perform policy-based resource management, as will be described in further detail below with reference to FIG. 6 and FIG. 7.

In accordance with one embodiment, even when there are insufficient resources to support the connection, the system may allocate a minimum level of resources to the connection in order to provide best effort service to the connection. This may be accomplished by placing the connection on a "wait list." Although multiple wait lists may be implemented, the disclosed embodiments are described with reference to a single wait list in order to simplify the description. For example, when a connection is placed on a wait list, packets associated with the connection may be placed in a low priority queue such as that shown in FIG. 2. More particularly, the connection may remain on the waitlistuntil sufficient resources are freed, enabling packets associated with the connection to be placed in a high priority queue such as that shown in FIG. 2. In this manner, the system may support a variety of connections that would otherwise be rejected by prior art systems.

Figure 4:
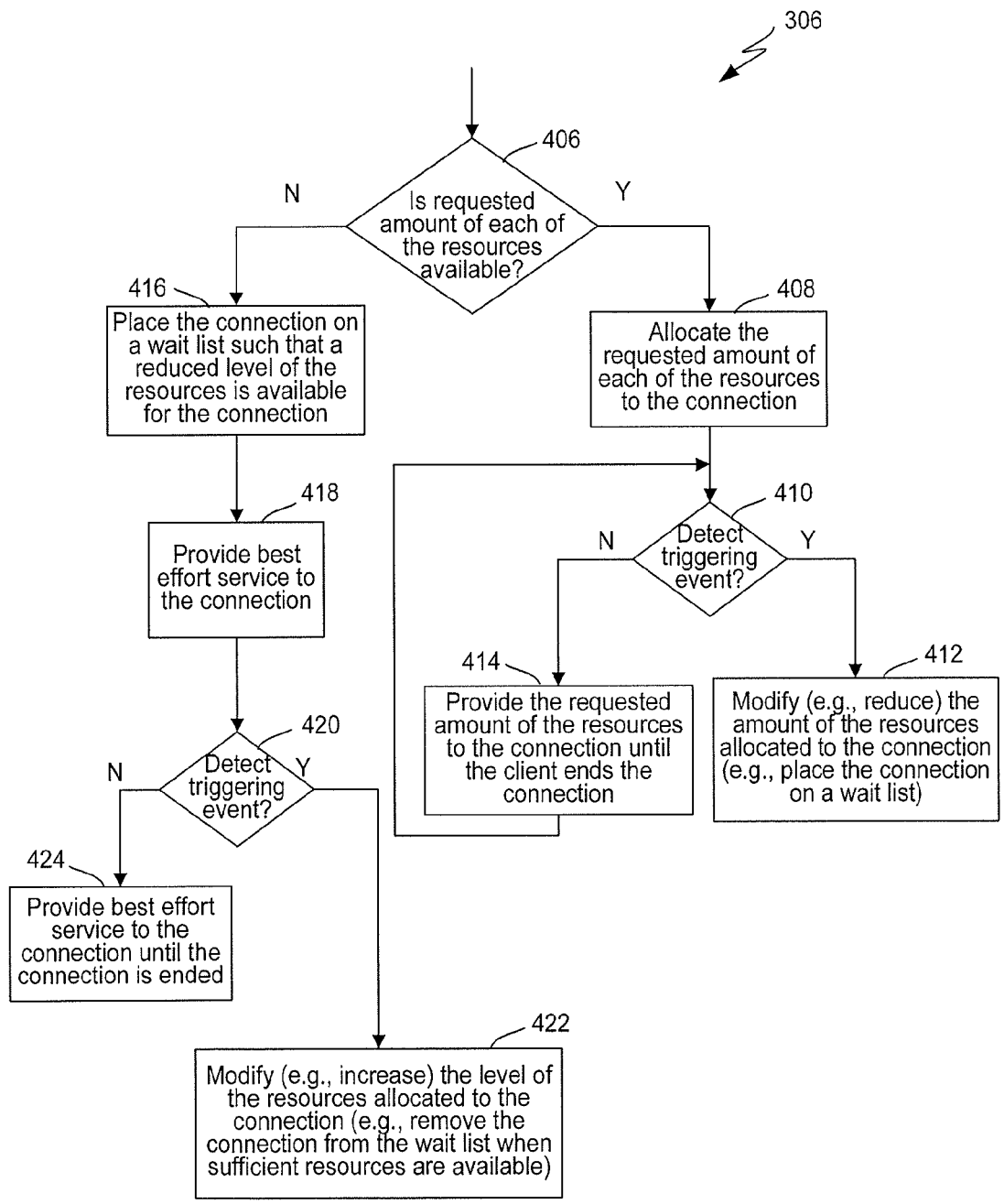
FIG. 4 is a process flow diagram illustrating an example method of performing resource management based upon whether the requested resources are available as shown at 306 of FIG. 3

FIG. 4 is a process flow diagram illustrating an example method of performing resource management based upon whether the requested resources are available as shown at 306 of FIG. 3. If the network device determines that the requested amount of each of the resources is available at 406, the network device may allocate the requested amount of each of the resources to the connection at 408. It is important to note that the network device allocates the resources to the connection, and not solely to the client. In this manner, the resources are allocated to support each of the endpoints to the connection.

A variety of triggering events may trigger the reduction of the amount of resources that are allocated to the connection. For instance, a triggering event may be the end of another connection, the receipt of a new connection, or a request from a client in association with an existing connection. As another example, a triggering event may also be time based, resulting in the trigger of the reduction of the amount of resources that are allocated to the connection after a pre-determined period of time lapses. For instance, a pre-paid calling card may be used in association with a call. As yet another example, a triggering event may be a request from the client that the connection (e.g., call) be upgraded (e.g., to an emergency call). For instance, the client may request a greater level of one or more resources (e.g., QoS). If the network device detects such a triggering event at 410, the network device may modify (e.g., reduce or increase) the amount of the resources that are allocated to the connection at 412, as will be described in further detail below with reference to FIG. 5A. For instance, the network device may place the connection on a wait list. If a triggering event is not detected, the network device may continue to provide the requested amount of each of the resources to the connection until the client or other endpoint ends the connection at 414 and therefore for the remainder of the session. The process may continue as shown at 410.

If the network device determines that the requested amount of each of the resources is not available at 406, the network device may place the connection on a wait list such that a reduced level of the resources is available to the connection at 416. Once the connection is placed on the wait list, the connection may receive best effort service at 418. In one embodiment, by providing best effort service to the connection, there is no QoS guarantee. In other words, the delivery of data that is transmitted over the connection is not guaranteed. However, the data path may be allowed to stay up.

A variety of triggering events may trigger the increase in the amount of resources that are allocated to a wait-listed connection. For instance, a triggering event may be the end of another connection. If the network device detects such a triggering event at 420, the network device may modify (e.g., increase) the amount of the resources that are allocated to the connection at 422, as will be described in further detail below with reference to FIG. 5A. For instance, the network device may remove the connection from the wait list when sufficient resources are available. Upon removing the connection from the wait list, the network device may allocate the previously requested amount of the resources to the connection. If a triggering event is not detected, the network device may continue to provide best effort service to the connection at 424.

Figure 5A:
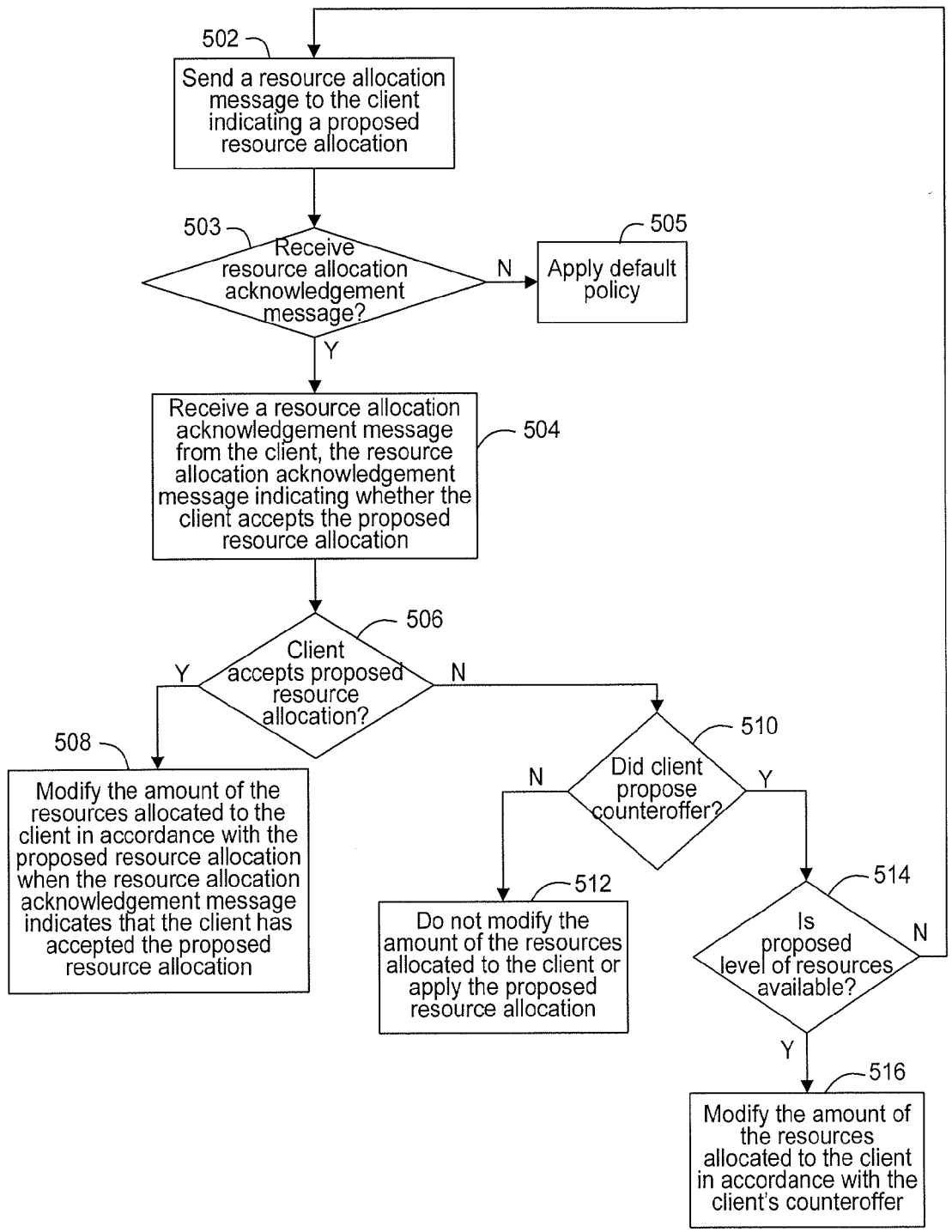
FIG. 5A is a process flow diagram illustrating an example method of modifying a level of resources previously allocated to a connection.

FIG. 5A is a process flow diagram illustrating an example method of modifying a level of resources previously allocated to a connection as shown at 412 and 422 of FIG. 4. The network device may send a resource allocation message to the client indicating a proposed resource allocation at 502. For instance, the proposed resource allocation may indicate a wait list priority for the connection (e.g., expected wait list time period and/or number of connections having a higher wait list priority) and/or an offer including one or more resource parameters and corresponding values.

The network device may determine whether it has received a resource allocation acknowledgement message at 503. The network device may receive a resource allocation acknowledgement message from the client at 504, where the resource allocation acknowledgement message indicates whether the client accepts the proposed resource allocation. The resource allocation acknowledgement message may also act as a counteroffer that indicates one or more resource parameters and corresponding values. Of course, if the network device determines that it has not received a resource allocation acknowledgement message from the client at 503, the network device may enforce a default enforcement policy at 505 in response to a timeout (e.g., after a pre-determined period of time).

If the network device determines at 506 from the resource allocation acknowledgement message that the client accepts the proposed resource allocation, the network device may modify the amount of the resources allocated to the client in accordance with the proposed resource allocation at 508. For instance, the network device may increase the amount of resources allocated to the connection (e.g., by removing the connection from a wait list) or decrease the amount of resources allocated to the connection (e.g., by adding the connection to a wait list).

However, if the network device determines at 506 that the client does not accept the proposed resource allocation, the network device may operate in accordance with the client's resource allocation acknowledgement message. More particularly, the network device may determine at 510 whether the client has proposed a counteroffer. Of course, the client may choose to disconnect and initiate the connection at a later time rather than receive a reduced level of resources. If the client has not proposed a counteroffer, the network device may not modify the amount of the resources allocated to the client at 512. Alternatively, if the client has not accepted the proposed resource allocation and has not proposed a counteroffer, the network device may still impose the proposed resource allocation (e.g., to provide resources to emergency calls).

Alternatively, if the client has provided a counteroffer, the network device may determine whether the proposed level of resources is available at 514. If the proposed level of resources is available, the network device may modify the amount of the resources allocated to the client in accordance with the client's counteroffer at 516. If the proposed level of resources is not available, the network device may continue to re-negotiate at 502. For instance, the client may indicate in the resource allocation acknowledgement message that the client requests that the negotiation continue.

The network device may send a resource allocation message to the client in all circumstances before modifying the amount of resources allocated to the connection. Alternatively, since the network device may assume that the client will always agree to an increase in the amount of resources allocated to the connection, it may be unnecessary for the network device to send a resource allocation message in these instances. Thus, in some embodiments, the network device may send a resource allocation message to the client before decreasing the amount of resources allocated to the connection.

The network device may also send a resource allocation message to the client in response to a request for resources. In other words, the network may make a "counteroffer" to the client in response to the initial request for resources transmitted by the client. As a result, the network device may send a resource allocation message prior to allocating resources or in order to modify the level of resources previously allocated to the connection.

Figure 5B:
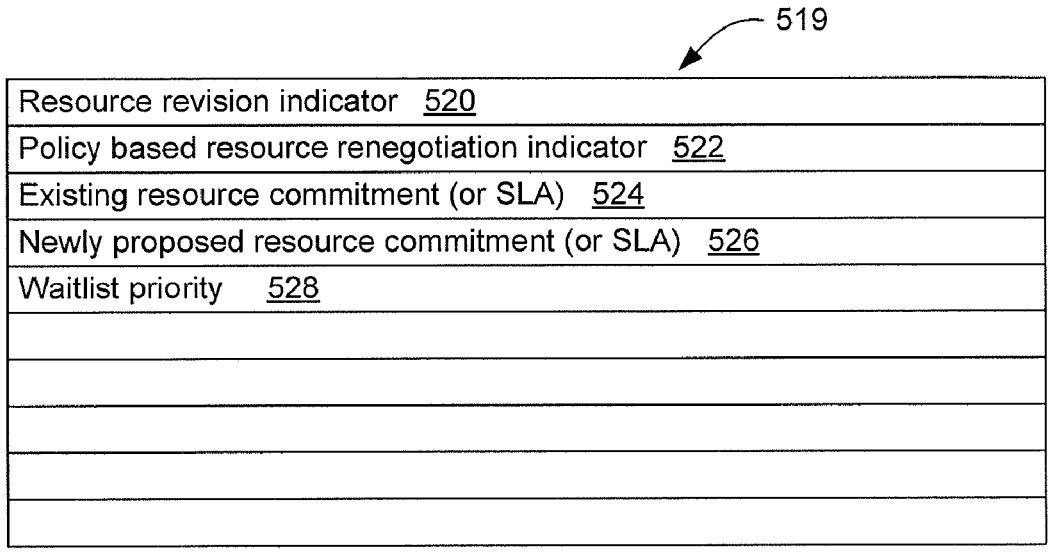
FIG. 5B is an example resource allocation message that may be transmitted during a process such as that described with reference to FIG. 5A.

FIG. 5B is an example resource allocation message 519 that may be transmitted during a process such as that described with reference to 502 of FIG. 5A. The resource allocation message 519 may operate as a request to modify the amount of resources that have been allocated to the client. The resource allocation message 519 may include a resource revision indicator 520 indicating that the amount of resources previously allocated to the connection should be temporarily revised. In addition, a policy based resource renegotiation indicator 522 may indicate that the request is originating from the network infrastructure (e.g., the network device). The resource allocation message may indicate an existing resource commitment (or SLA) 524. More particularly, the existing resource commitment may indicate an amount of each of the resources that has been allocated to the connection. In addition, the resource allocation message 519 may indicate a newly proposed resource commitment (or SLA) 526, which may indicate a proposed amount for each of the resources. The resource allocation message 519 may also indicate a waitlist priority 528. The waitlist priority 528 may be a policy-based priority number indicating when the client's resources will be considered for restoration when the conditions change. For example, the waitlist priority 528 may indicate a number of connections on the waitlist having a higher priority than the connection. The resource allocation message 519 may also provide an estimate of the time that may elapse until the resources may be restored.

Figure 5C:
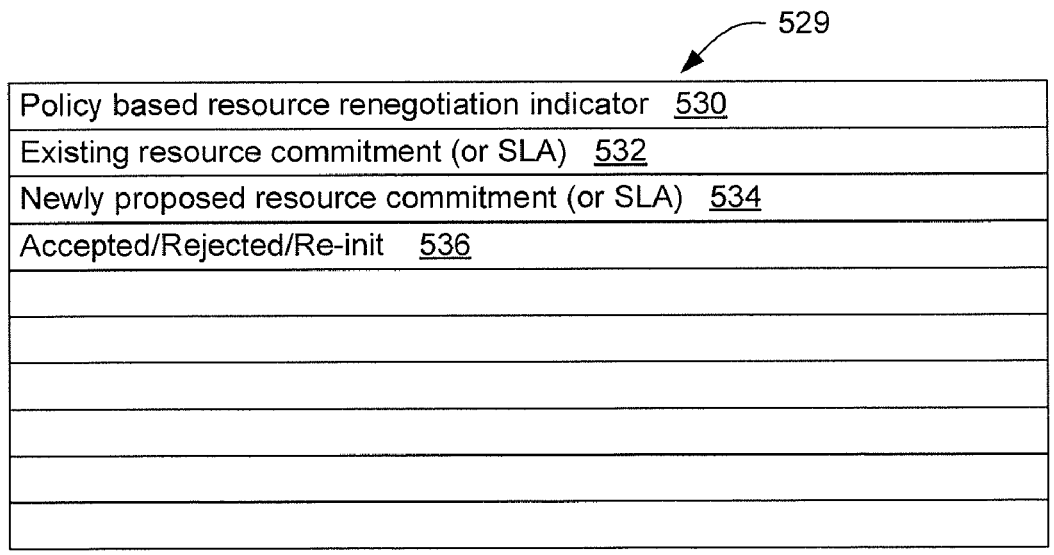
FIG. 5C is an example resource allocation acknowledgement message that may be transmitted during a process such as that described with reference to FIG. 5A.

The client may either accept or reject the revisions proposed in the resource allocation message 519 by sending a resource allocation acknowledgement message. FIG. 5C is an example resource allocation acknowledgement message 529 that may be transmitted at 504 of FIG. 5A. The resource allocation acknowledgement message 529 may operate as a counteroffer to the resource allocation message 519. The resource allocation acknowledgement message 529 may include a policy based resource renegotiation indicator 530, which may indicate that the request is originating from client. The resource allocation message may indicate an existing resource commitment (or SLA) 532. More particularly, the existing resource commitment may indicate an amount of each of the resources that has been allocated to the connection. In addition, the resource allocation acknowledgement message 529 may indicate a newly proposed resource commitment (or SLA) 534, which may indicate a proposed amount for each of the resources. The resource allocation acknowledgement message 529 may also indicate whether the client accepts or rejects the network proposed renegotiated temporary values as shown at 536. Alternatively, the client may request that the network infrastructure restart resource negotiation (e.g., by sending another resource allocation message).

The connection may be a call supported by a protocol such as Session Initiation Protocol (SIP), H.323, or a Voice over IP (VoIP) signaling protocol such as a proprietary protocol. The system may assign various types of connections a higher priority than other types of connections. For example, since voice is more sensitive to delay, the system may assign a voice call a higher priority than an email communication. As another example, a voice call may receive a higher priority than a video call. Mechanisms for performing policy-based resource management will be described below with reference to FIG. 6 and FIG. 7.

Figure 6:
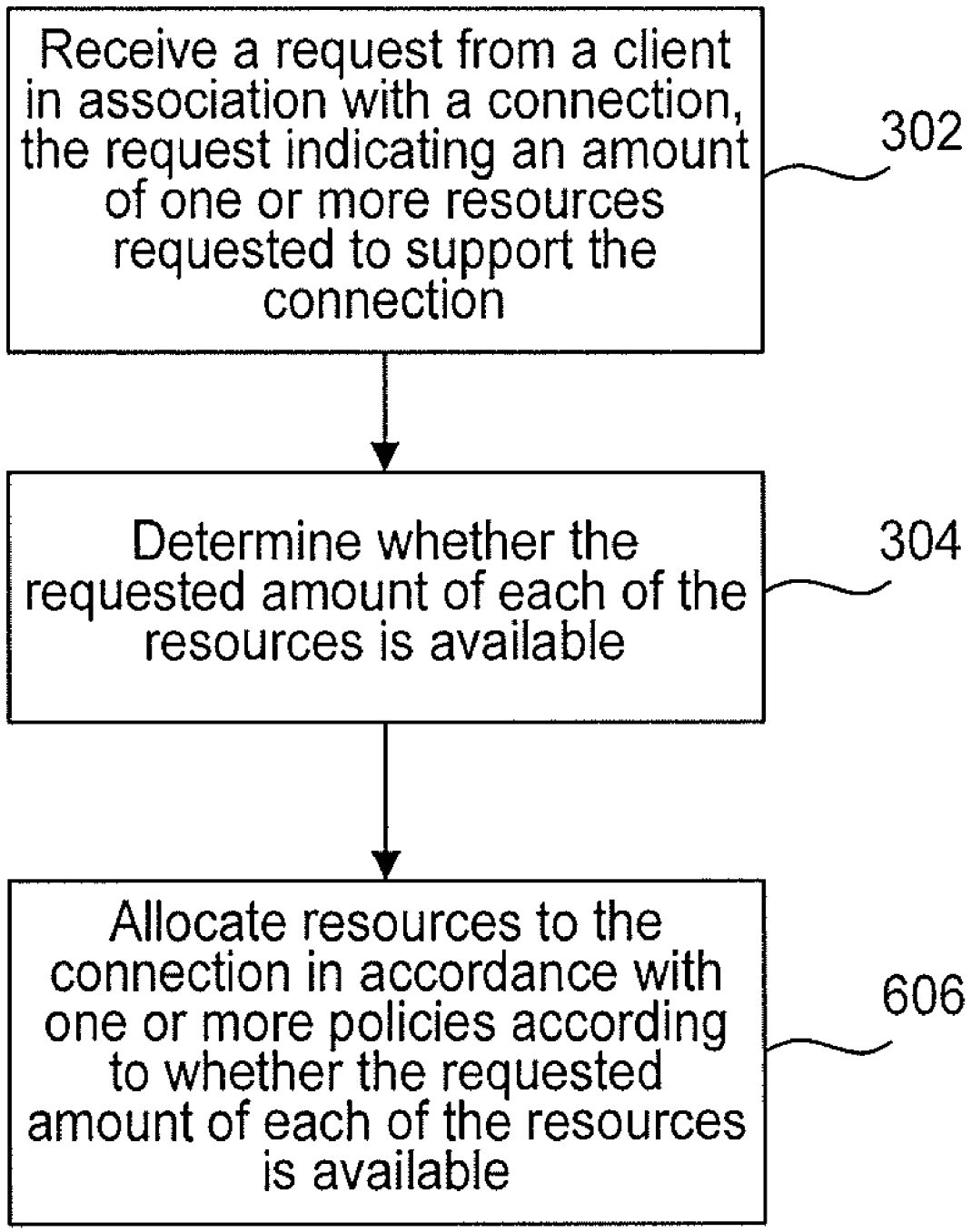
FIG. 6 is a process flow diagram illustrating an example method of performing policy-based resource management.

FIG. 6 is a process flow diagram illustrating an example method of performing policy-based resource management. As described above with reference to FIG. 3, a network device such as an access point or network controller may receive a request from a client in association with a connection at 302. The request may indicate an amount of each of one or more resources that is requested to support the connection. The network device may determine whether the requested amount of each of the resources is available at 304. The network device may allocate a level of each of the resources to the connection in accordance with one or more policies at 606 according to whether the requested amount of each of the resources is available. More particularly, the network device may be statically (or dynamically) configured with the policies, as well as any changes to the policies.

A policy may be used to indicate a priority of a connection with respect to other connections. One example of a policy is to prioritize connections based upon the type of the connection. For instance, types of connections such as voice, video, and email may be ranked such that the types of connections that are most sensitive to a time delay will be prioritized. As a result, a voice call would receive a higher priority than an email. Moreover, a policy may give certain clients or groups of clients different priorities. For instance, it may be desirable to prioritize communications by specific individuals within a company, or communications by specific organizations within a company. It is also possible that a policy may take into consideration the time during which a particular connection is established or maintained. The policy (or policies) that may be applied to a connection may vary according to the time of day or other criteria.

Figure 7:
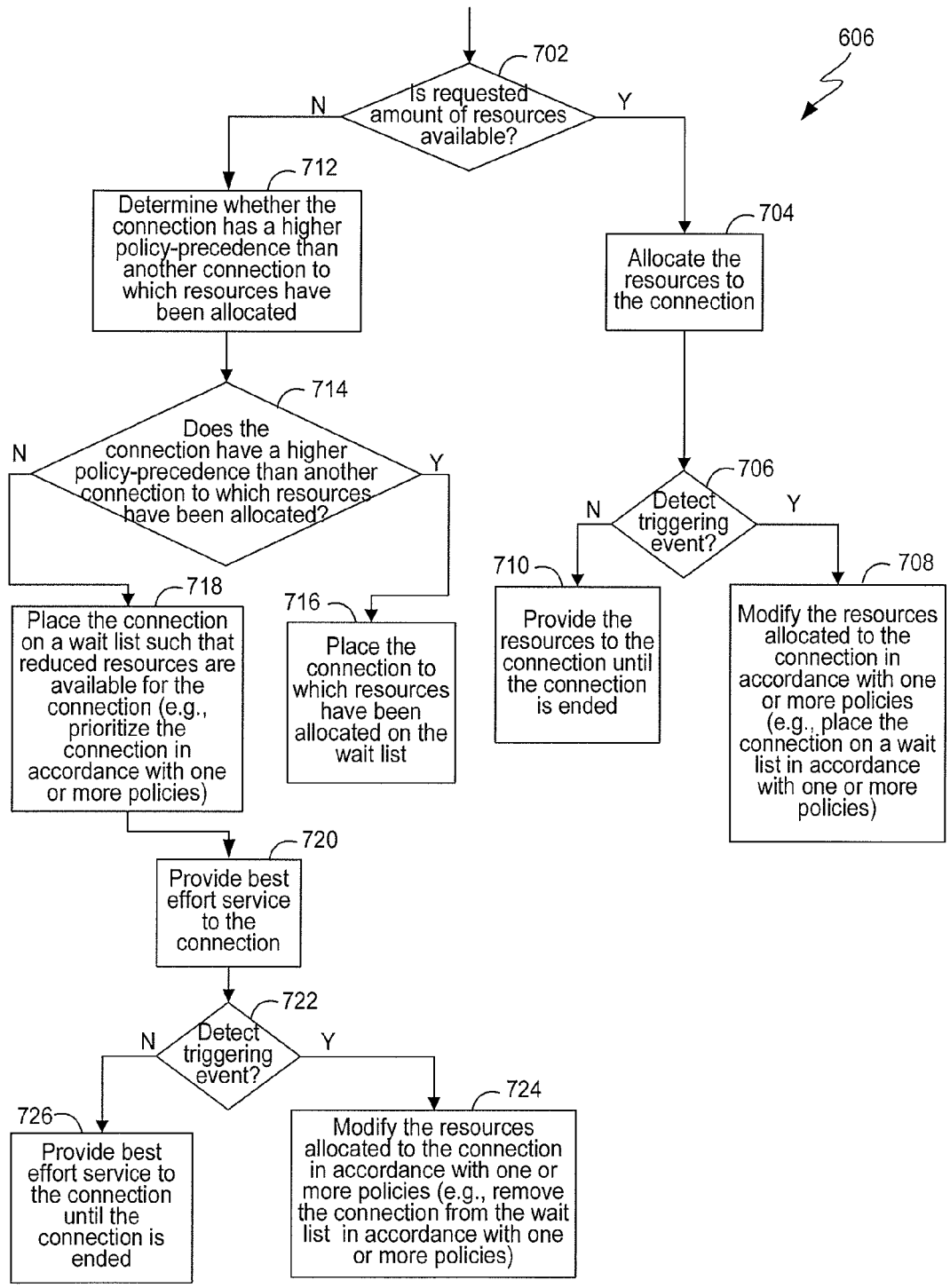
FIG. 7 is a process flow diagram illustrating an example method of performing policy-based resource management based upon whether the requested resources are available as shown at 606 of FIG. 6.

FIG. 7 is a process flow diagram illustrating an example method of performing policy-based resource management based upon whether the requested resources are available as shown at 606 of FIG. 6. If the network device determines that the requested amount of each of the resources is available at 702, the network device may allocate the requested amount of each of the resources to the connection at 704. In this manner, the resources are allocated to support each of the endpoints to the connection.

A variety of triggering events may trigger the reduction of the amount of resources that are allocated to the connection. For instance, a triggering event may be the receipt of a new connection. If the network device detects such a triggering event at 706, the network device may modify (e.g., reduce) the amount of the resources that are allocated to the connection at 708 in accordance with one or more policies. For instance, the network device may determine whether another connection (e.g., new connection) has a higher policy precedence and therefore a higher priority than the connection. If the new connection is determined to have a higher policy precedence than the connection, the connection may be placed on the wait list in order to release resources that may be allocated to the new connection. In other words, a connection (e.g., call) may be guaranteed bandwidth until another connection with a higher policy precedence requests resources that are not immediately available.

In order to reduce the amount of resources that are allocated to the connection, the network device may place the connection on a wait list. Upon placing the connection on the wait list, the network device may reduce the amount of the resources that are allocated to the connection. If a triggering event is not detected, the network device may continue to provide the requested amount of each of the resources to the connection until the client or other endpoint ends the connection at 710.

If the network device determines that the requested amount of each of the resources is not available at 702, the network device may "re-distribute" the resources in accordance with one or more policies. More particularly, the network device may determine at 712 whether the connection has a higher policy-precedence than another connection to which resources have previously been allocated.

Newly received high priority connections have precedence over existing connections having a lower priority. Thus, if the network device determines that the connection has a higher policy-precedence than another connection to which resources have previously been allocated at 714, the network device may place the connection to which resources have previously been allocated on a wait list at 716. By placing another connection the wait list, the network device may release the resources previously allocated to the wait-listed connection. As a result, the network device may proceed to allocate the requested amount of the resources to the newly received connection at 704. In this manner, the network device may reallocate resources from a lower priority connection to a higher priority connection.

If the network device determines that the connection does not have a higher policy-precedence than another connection to which resources have previously been allocated at 714, the network device may place the connection on a wait list in accordance with one or more policies such that a reduced level of the resources is available to the connection at 718. The network device may also prioritize the connection among other connections on the wait list in accordance with one or more policies. Once the network device places the connection on the wait list, the network device may provide the connection best effort service at 720. Thus, in the event that the requested amount of the resources is not available, the network device may place the connection on a wait list unless the connection has a higher policy-precedence than another connection to which resources have previously been allocated.

A variety of triggering events may trigger the increase in the amount of resources that are allocated to a wait-listed connection. For instance, a triggering event may be the end of another connection. If the network device detects such a triggering event at 722, the network device may modify (e.g., increase) the amount of the resources that are allocated to the connection at 724 in accordance with one or more policies. For instance, the network device may remove the connection from the wait list in accordance with one or more policies (e.g., when the requested resources are available). More particularly, assuming that no other wait-listed connections have a higher policy precedence than the connection, the network device may remove the connection from the wait list. Upon removing the connection from the wait list, the network device may allocate the previously requested amount of the resources to the connection.

In accordance with various embodiments, resources that have been allocated to the connection may be modified at 708 and 724 in accordance with a process such as that shown in FIG. 5A. For instance, the network device may notify the client that the resources that have previously been allocated to the connection may be modified. The client may either accept the modification or send a counteroffer to the network device.

If a triggering event is not detected, the network device may continue to provide best effort service to the connection at 726. More particularly, the network device may allocate a reduced level of resources to the connection. Thus, the connection may be supported during the remainder of the session without a QoS guarantee.

Although the above description refers to a single wait list in order to simplify the description, it is important to note that the disclosed embodiments may also be implemented using multiple wait lists. For instance, each wait list may be associated with a different type of connection or data communication. In this manner, the network device may easily ascertain which connection has the highest priority.

The disclosed embodiments support resource management in a network such as a wireless network. This may be accomplished through the application of one or more policies. As a result, the resources that are committed to a connection may dynamically vary when a triggering event occurs. In this manner, clients may roam in a network in which available resources are dynamically changing.

Generally, the techniques for performing the disclosed embodiments may be implemented on software and/or hardware. For example, they can be implemented in an operating system kernel, in a separate user process, in a library package bound into network applications, on a specially constructed machine, or on a network interface card. In a specific embodiment, the disclosed techniques are implemented in software such as an operating system or in an application running on an operating system.

A software or software/hardware hybrid packet processing system of the disclosed embodiments may be implemented on a general-purpose programmable machine selectively activated or reconfigured by a computer program stored in memory. Such programmable machine may be a network device designed to handle network traffic. Such network devices typically have multiple network interfaces. Specific examples of such network devices include routers, switches, and access points. For example, the packet processing systems of the disclosed embodiments may be implemented via wireless controller models 4400 series and 2006 series, and access points models 1000 series and 12xx series available from Cisco Systems, Inc. of San Jose, Calif. The network devices may be specially configured routers such as specially configured router models 1600, 2500, 2600, 3600, 4500, 4700, 7200, 7500, and 12000 available from Cisco Systems, Inc. of San Jose, Calif. A general architecture for some of these machines will appear from the description given below. Further, the disclosed embodiments may be at least partially implemented on a card (e.g., an interface card) for a network device or a general-purpose computing device.

In one embodiment, the network device implementing the disclosed embodiments is a router. Referring now to FIG. 8, a router 810 suitable for implementing the disclosed embodiments includes a master central processing unit (CPU) 862, interfaces 868, and a bus 815 (e.g., a PCI bus). When acting under the control of appropriate software or firmware, the CPU 862 is responsible for such router tasks as routing table computations and network management. It may also be responsible for implementing the disclosed embodiments, in whole or in part. The router may accomplish these functions under the control of software including an operating system (e.g., the Internetwork Operating System (IOS®) of Cisco Systems, Inc.) and any appropriate applications software.

CPU 62 may include one or more processors 863 such as a processor from the Motorola family of microprocessors or the MIPS family of microprocessors. In an alternative embodiment, processor 863 is specially designed hardware for controlling the operations of router 10. In a specific embodiment, a memory 861 (such as non-volatile RAM and/or ROM) also forms part of CPU 862. However, there are many different ways in which memory could be coupled to the system. Memory block 861 may be used for a variety of purposes such as, for example, caching and/or storing data, programming instructions, etc.

The interfaces 868 are typically provided as interface cards (sometimes referred to as "line cards"). Generally, they control the sending and receiving of data packets or data segments over the network and sometimes support other peripherals used with the router 810. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, Asynchronous Transfer Mode (ATM) interfaces, High-Speed Serial Interface (HSSI) interfaces, Packet over Synchronous Optical Network (POS) interfaces, Fiber Distributed Data Interface (FDDI) interfaces, Local Area Network (LAN) interfaces, Wireless Area Network (WAN) interfaces, metropolitan area network (MAN) interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 862 to efficiently perform routing computations, network diagnostics, security functions, etc.

Although the system shown in FIG. 8 is one specific router that may be used to implement the disclosed embodiments, it is by no means the only router architecture on which the disclosed embodiments can be implemented. For example, an architecture having a single processor that handles communications as well as routing computations, etc. is often used. Further, other types of interfaces and media could also be used with the router.

Regardless of network device's configuration, it may employ one or more memories or memory modules (such as, for example, memory block 865) configured to store data, program instructions for the general-purpose network operations and/or the inventive techniques described herein. The program instructions may control the operation of an operating system and/or one or more applications, for example.

Because such information and program instructions may be employed to implement the systems/methods described herein, the disclosed embodiments relate to machine readable media that include program instructions, state information, etc. for performing various operations described herein. Examples of machine-readable media include, but are not limited to, magnetic media such as hard disks, floppy disks, and magnetic tape; optical media such as CD-ROM disks and DVDs; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Although illustrative embodiments and applications of the disclosed embodiments are shown and described herein, many variations and modifications are possible which remain within the concept, scope, and spirit of the disclosed embodiments, and these variations would become clear to those of ordinary skill in the art after perusal of this application. Moreover, the disclosed embodiments need not be performed using the steps described above. Accordingly, the present embodiments are to be considered as illustrative and not restrictive, and the disclosed embodiments are not to be limited to the details given herein, but may be modified within the scope and equivalents of the appended claims.

What is claimed is:

1. An apparatus, comprising:
a processor; and
a memory, at least one of the processor or the memory being adapted for:
receiving by a network device a request from a client in association with a connection, the request indicating an amount of one or more resources that is requested to support the connection;
determining by the network device whether the amount of the resources is available;
allocating by the network device a level of the resources to the connection according to whether the amount of the resources available in accordance with one or more policies, wherein at least one of the policies is based, at least in part, upon a type of the connection;
wherein the network device maintains a wait list identifying wait-listed connections, wherein best effort service is provided to the wait-listed connections until requested amounts of resources are available, wherein a reduced level of the resources is allocated to the wait-listed connections, wherein best effort service includes supporting the wait-listed connections without providing a Quality of Service (QoS) guarantee to the wait-listed connections;
wherein the request is a connection request requesting that the connection be established, and wherein the connection is placed on the wait list when it is determined that the amount of resources is not available, thereby enabling the connection to be supported until the amount of resources is available, wherein a reduced level of the resources is allocated to the connection, enabling the connection to be supported without a Quality of Service (QoS) guarantee while the connection is on the wait list;
sending by the network device a resource allocation message to the client indicating a proposed resource allocation, the proposed resource allocation indicating a proposed amount of one or more of the resources; and
receiving by the network device a resource allocation acknowledgement message from the client, the resource allocation acknowledgement message indicating whether the client accepts the proposed resource allocation, and wherein the resource allocation acknowledgement message is a counteroffer including an alternate resource allocation different from the proposed resource allocation.

2. A method, comprising:
receiving by a network device a request from a client in association with a connection, the request indicating an amount of one or more resources that is requested to support the connection;
determining by the network device whether the amount of the resources is available;
determining by the network device based upon one or more policies whether the connection has a higher priority than another connection to which resources have previously been allocated, wherein determining by the network device based upon one or more policies whether the connection has a higher priority than another connection to which resources have previously been allocated includes determining based, at least in part, upon a type of the connection and a type of the another connection whether the connection has a higher priority than the another connection to which resources have previously been allocated; and
allocating by the network device a level of the resources to the connection based, at least in part, upon whether the connection has a higher priority than another connection to which resources have previously been allocated;
wherein the network device maintains a wait list identifying wait-listed connections, wherein best effort service is provided to the wait-listed connections until requested amounts of resources are available, wherein a reduced level of the resources is allocated to the wait-listed connections, wherein best effort service includes supporting the wait-listed connections without providing a Quality of Service (QoS) guarantee to the wait-listed connections.

3. The method as recited in claim 2, wherein the request indicates an amount of each of the resources that is requested.

4. The method as recited in claim 2, wherein when it is determined that the amount of each of the resources that has been requested is not available, placing by the network device the connection on a wait list such that a reduced level of the resources is available to the connection, wherein the connection receives best effort service after the connection is placed on the wait list.

5. The method as recited in claim 4, further comprising:
removing by the network device the connection from the wait list when the amount of each of the resources that has been requested is available.

6. The method as recited in claim 2, further comprising:
allocating by the network device the amount of each of the resources that has been requested to the connection.

7. The method as recited in claim 2, further comprising:
modifying by the network device the level of the resources that has been allocated to the connection in response to a triggering event.

8. The method as recited in claim 7, wherein the triggering event is a receipt of a subsequent request from the client in association with the connection after the connection has been established.

9. The method as recited in claim 7, wherein the triggering event is a receipt of another connection.

10. The method as recited in claim 7, further comprising:
placing by the network device the connection on the wait list in response to a triggering event; and
notifying the client that the connection has been placed on the wait list.

11. The method as recited in claim 2, further comprising:
sending by the network device a resource allocation message to the client indicating a proposed resource allocation, the proposed resource allocation indicating a proposed amount of one or more of the resources.

12. The method as recited in claim 2, further comprising:
placing by the network device the connection on the wait list; and
sending by the network device a resource allocation message to the client, the resource allocation message indicating a wait list priority for the connection with respect to other connections on the wait list.

13. The method as recited in claim 2, wherein the connection is a voice call and wherein the type of the connection is voice.

14. The method as recited in claim 2, further comprising:
modifying by the network device the level of the resources allocated to the connection in accordance with one or more policies.

15. The method as recited in claim 2, further comprising:
sending by the network device a resource allocation message to the client indicating a proposed resource allocation, the proposed resource allocation indicating a proposed reduction in the level of one or more of the resources allocated to the connection; and
reducing by the network device the level of the resources allocated to the connection based upon one or more policies.

16. The method as recited in claim 2, further comprising:
increasing by the network device the level of the resources allocated to the connection based upon one or more policies;
wherein the network device does not send a resource allocation message to the client indicating a proposed resource allocation prior to increasing the level of resources allocated to the connection.

17. The method as recited in claim 2, further comprising:
when it is determined that the amount of the resources is not available, placing by the network device the connection on a wait list in accordance with one or more policies.

18. The method as recited in claim 17, further comprising:
removing by the network device the connection from the wait list based upon one or more policies; and
increasing by the network device the level of the resources allocated to the connection.

19. The method as recited in claim 2, further comprising:
when the connection does not have a higher priority than another connection to which resources have previously been allocated, placing by the network device the connection on the wait list such that a reduced level of the resources is allocated to the connection.

20. The method as recited in claim 2, further comprising:
when the connection has a higher priority than another connection to which resources have previously been allocated, placing by the network device the another connection on the wait list and allocating a level of the resources previously allocated to the another connection to the connection.

21. The method as recited in claim 2, wherein when the amount of the one or more resources that is requested to support the connection is available, removing the connection from the wait list and providing the resources to the connection.

22. The method as recited in claim 2, wherein best effort service is provided to all of the wait-listed connections until requested amounts of resources are available.

23. The method as recited in claim 2, wherein the type of the connection is voice, video, or electronic mail.

24. A method, comprising:
receiving by a network device a request from a client in association with a connection, the request indicating an amount of one or more resources that is requested to support the connection;
determining by the network device whether the amount of the resources is available;
allocating by the network device a level of the resources to the connection according to whether the amount of the resources available in accordance with one or more policies, wherein at least one of the policies is based, at least in part, upon a type of the connection;
wherein the network device maintains a wait list identifying wait-listed connections, wherein best effort service is provided to the wait-listed connections until requested amounts of resources are available, wherein a reduced level of the resources is allocated to the wait-listed connections, wherein best effort service includes supporting the wait-listed connections without providing a Quality of Service (QoS) guarantee to the wait-listed connections;
wherein the request is a connection request requesting that the connection be established, and wherein the connection is placed on the wait list when it is determined that the amount of resources is not available, thereby enabling the connection to be supported until the amount of resources is available, wherein a reduced level of the resources is allocated to the connection, enabling the connection to be supported without a Quality of Service (QoS) guarantee while the connection is on the wait list;
sending by the network device a resource allocation message to the client indicating a proposed resource allocation, the proposed resource allocation indicating a proposed amount of one or more of the resources; and
receiving by the network device a resource allocation acknowledgement message from the client, the resource allocation acknowledgement message indicating whether the client accepts the proposed resource allocation, and wherein the resource allocation acknowledgement message is a counteroffer including an alternate resource allocation different from the proposed resource allocation.

25. A method, comprising:
receiving by a network device a request from a client in association with a connection, the request indicating an amount of one or more resources that is requested to support the connection;
determining by the network device whether the amount of the resources is available; and
allocating by the network device a level of the resources to the connection according to whether the amount of the resources available in accordance with one or more policies, wherein at least one of the policies is based, at least in part, upon a type of the connection;
wherein the network device maintains a wait list identifying wait-listed connections, wherein best effort service is provided to the wait-listed connections until requested amounts of resources are available, wherein a reduced level of the resources is allocated to the wait-listed connections, wherein best effort service includes supporting the wait-listed connections without providing a Quality of Service (QoS) guarantee to the wait-listed connections;
sending by the network device a resource allocation message to the client indicating a proposed resource allocation, the proposed resource allocation indicating a proposed amount of one or more of the resources; and
receiving by the network device a resource allocation acknowledgement message from the client, the resource allocation acknowledgement message indicating whether the client accepts the proposed resource allocation, and wherein the resource allocation acknowledgement message is a counteroffer including an alternate resource allocation different from the proposed resource allocation;

wherein the resource allocation acknowledgement message indicates an amount of each of the resources that has been allocated to the connection.

26. A method, comprising:
receiving by a network device a request from a client in association with a connection, the request indicating an amount of one or more resources that is requested to support the connection;
determining by the network device whether the amount of the resources is available;
allocating by the network device a level of the resources to the connection according to whether the amount of the resources available in accordance with one or more policies, wherein at least one of the policies is based, at least in part, upon a type of the connection;
wherein the network device maintains a wait list identifying wait-listed connections, wherein best effort service is provided to the wait-listed connections until requested amounts of resources are available, wherein a reduced level of the resources is allocated to the wait-listed connections, wherein best effort service includes supporting the wait-listed connections without providing a Quality of Service (QoS) guarantee to the wait-listed connections; and
sending by the network device a resource allocation message to the client indicating a proposed resource allocation, the proposed resource allocation indicating a proposed amount of one or more of the resources;
wherein the resource allocation message comprises a resource revision indicator indicating that the amount of resources previously allocated to the connection should be temporarily revised.

27. The method as recited in claim 26, wherein the resource allocation message indicates an amount of each of the resources that has been allocated to the connection.

28. The method as recited in claim 26, wherein the resource allocation message further comprises a waitlist priority indicating when the resources will be considered for restoration to the client.

29. A method, comprising:
receiving by a network device a request from a client in association with a connection, the request indicating an amount of one or more resources that is requested to support the connection;
determining by the network device whether the amount of the resources is available; and
allocating by the network device a level of the resources to the connection according to whether the amount of the resources available in accordance with one or more policies, wherein at least one of the policies is based, at least in part, upon a type of the connection;
wherein the network device maintains a wait list identifying wait-listed connections, wherein best effort service is provided to the wait-listed connections until requested amounts of resources are available, wherein a reduced level of the resources is allocated to the wait-listed connections, wherein best effort service includes supporting the wait-listed connections without providing a Quality of Service (QoS) guarantee to the wait-listed connections; and
sending by the network device a resource allocation message to the client indicating a proposed resource allocation, the proposed resource allocation indicating a proposed amount of one or more of the resources and including an estimate of time until the resources will be restored.

30. An apparatus, comprising:
a processor; and
a memory, at least one of the processor or the memory being adapted for:
receiving by a network device a request from a client in association with a connection, the request indicating an amount of one or more resources that is requested to support the connection;
determining by the network device whether the amount of the resources is available;
determining by the network device based upon one or more policies whether the connection has a higher priority than another connection to which resources have previously been allocated, wherein determining by the network device based upon one or more policies whether the connection has a higher priority than another connection to which resources have previously been allocated includes determining based, at least in part, upon a type of the connection and a type of the another connection whether the connection has a higher priority than the another connection to which resources have previously been allocated; and
allocating by the network device a level of the resources to the connection based, at least in part, upon whether the connection has a higher priority than another connection to which resources have previously been allocated;
wherein the network device maintains a wait list identifying wait-listed connections, wherein best effort service is provided to the wait-listed connections until requested amounts of resources are available, wherein a reduced level of the resources is allocated to the wait-listed connections, wherein best effort service includes supporting the wait-listed connections without providing a Quality of Service (QoS) guarantee to the wait-listed connections.

31. The apparatus as recited in claim 30, at least one of the processor or the memory being adapted for performing steps further comprising:
when it is determined that the amount of the resources is not available, placing by the network device the connection on a wait list in accordance with one or more policies.

32. The apparatus as recited in claim 31, at least one of the processor or the memory being adapted for performing steps further comprising:
removing by the network device the connection from the wait list based upon one or more policies; and
increasing by the network device the level of the resources allocated to the connection.

33. The apparatus as recited in claim 30, at least one of the processor or the memory being adapted for performing steps further comprising:
when the connection does not have a higher priority than another connection to which resources have previously been allocated, placing by the network device the connection on the wait list such that a reduced level of the resources is allocated to the connection.

34. The apparatus as recited in claim 30, at least one of the processor or the memory being adapted for performing steps further comprising:
when the connection has a higher priority than another connection to which resources have previously been allocated, placing by the network device the another connection on the wait list and allocating a level of the resources previously allocated to the another connection to the connection.

35. The apparatus as recited in claim 30, wherein when the amount of the one or more resources that is requested to support the connection is available, removing the connection from the wait list and providing the resources to the connection.

36. A non-transitory computer-readable medium storing thereon computer-readable instructions, comprising:
- instructions for obtaining by a network device a request from a client in association with a connection, the request indicating an amount of one or more resources that is requested to support the connection;
- instructions for determining by the network device whether the amount of the resources is available;
- instructions for determining by the network device based upon one or more policies whether the connection has a higher priority than another connection to which resources have previously been allocated, wherein determining by the network device based upon one or more policies whether the connection has a higher priority than another connection to which resources have previously been allocated includes determining based, at least in part, upon a type of the connection and a type of the another connection whether the connection has a higher priority than the another connection to which resources have previously been allocated; and
- instructions for allocating by the network device a level of the resources to the connection based, at least in part, upon whether the connection has a higher priority than another connection to which resources have previously been allocated;
- wherein the network device maintains a wait list identifying wait-listed connections, wherein best effort service is provided to the wait-listed connections until requested amounts of resources are available, wherein a reduced level of the resources is allocated to the wait-listed connections, wherein best effort service includes supporting the wait-listed connections without providing a Quality of Service (QoS) guarantee to the wait-listed connections.

* * * * *